(12) United States Patent
Wirtz et al.

(10) Patent No.: US 10,920,984 B2
(45) Date of Patent: Feb. 16, 2021

(54) AIRBLAST FUEL NOZZLE

(71) Applicant: Parker-Hannifin Corporation, Cleveland, OH (US)

(72) Inventors: Luther Wirtz, Mentor, OH (US); Jeffrey Lehtinen, Concord Township, OH (US); Adel Mansour, Mentor, OH (US); David Tibbs, Summerville, SC (US); Robert Pelletier, Chardon, OH (US); Jon Stockill, Rugeley (GB)

(73) Assignee: Parker-Hannifin Corporation, Cleveland, OH (US)

( * ) Notice: Subject to any disclaimer, the term of this patent is extended or adjusted under 35 U.S.C. 154(b) by 281 days.

(21) Appl. No.: 15/959,362

(22) Filed: Apr. 23, 2018

(65) Prior Publication Data

US 2018/0304281 A1    Oct. 25, 2018

Related U.S. Application Data

(60) Provisional application No. 62/489,523, filed on Apr. 25, 2017.

(51) Int. Cl.
*F23R 3/28* (2006.01)
*F23R 3/12* (2006.01)
*F23R 3/14* (2006.01)

(52) U.S. Cl.
CPC ............... *F23R 3/12* (2013.01); *F23R 3/14* (2013.01); *F23R 3/28* (2013.01); *F23R 2900/00005* (2013.01)

(58) Field of Classification Search
CPC .... F23R 3/12; F23R 3/14; F23R 3/283; F23R 3/286; F23D 11/103–105; F23D 11/107; F23D 11/383
See application file for complete search history.

(56) References Cited

U.S. PATENT DOCUMENTS

| 5,435,126 A | 7/1995 | Beaudoin |
| 5,505,045 A | 4/1996 | Lee et al. |
| 6,141,967 A | 11/2000 | Angel et al. |
| 6,547,163 B1 | 4/2003 | Mansour et al. |
| 6,622,488 B2 | 9/2003 | Mansour et al. |
| 7,870,737 B2 | 1/2011 | Snyder |
| 7,926,744 B2 | 4/2011 | Thomson et al. |

(Continued)

FOREIGN PATENT DOCUMENTS

| CN | 204006118 | 12/2014 |
| EP | 0939275 | 9/1999 |
| EP | 2592351 | 4/2017 |

*Primary Examiner* — Steven M Sutherland
(74) *Attorney, Agent, or Firm* — Renner, Otto, Boisseile & Sklar, LLP

(57) ABSTRACT

A fuel injector for a gas turbine engine of an aircraft having a fuel nozzle including a fuel swirler and/or an outer air swirler. The fuel swirler may include a manifold for receiving fuel from a fuel conduit, and a plurality of fuel passages to direct fuel from the manifold to discharge orifices that direct fuel with swirling flow. The fuel swirler may be configured to provide uniform spray while minimizing recirculation zones; reduce residence time as fuel enters the manifold; minimize flow disruptions, boundary layer growth, and/or pressure drop as fuel flows through the fuel passages; reduces coking internally of the nozzle; reduces thermal stresses; and is simple and low-cost to manufacture.

24 Claims, 12 Drawing Sheets

(56) References Cited

U.S. PATENT DOCUMENTS

| | | |
|---|---|---|
| 8,146,837 B2 | 4/2012 | Thomson et al. |
| 9,429,074 B2 | 8/2016 | Williams et al. |
| 9,447,974 B2 * | 9/2016 | Max ..................... F23D 11/107 |
| 9,581,121 B2 | 2/2017 | Ryon et al. |
| 2012/0291444 A1 * | 11/2012 | Oskam ..................... F23R 3/28 |
| | | 60/772 |
| 2014/0291418 A1 | 10/2014 | Ruffing et al. |
| 2017/0284678 A1 * | 10/2017 | Venkatesan ............... F23R 3/28 |

* cited by examiner

AIRBLAST FUEL NOZZLE

RELATED APPLICATIONS

This application claims the benefit of U.S. Provisional Application No. 62/489,523 filed Apr. 25, 2017, which is hereby incorporated herein by reference in its entirety.

FIELD OF INVENTION

The present invention relates generally to turbine engines, and more particularly fuel injectors having fuel nozzles for turbine engines, such as an airblast-type fuel nozzle.

BACKGROUND

A turbine engine typically includes an outer casing extending radially from an air diffuser and a combustion chamber. The casing encloses a combustor for containment of burning fuel. The combustor includes a liner and a combustor dome, and an igniter is mounted to the casing and extends radially inwardly into the combustor for igniting fuel.

The turbine also typically includes one or more fuel injectors for directing fuel from a manifold to the combustor. Fuel injectors also function to prepare the fuel for mixing with air prior to combustion. Each injector typically has an inlet fitting connected either directly or via tubing to the manifold, a tubular extension or stem connected at one end to the fitting, and one or more spray nozzles connected to the other end of the stem for directing the fuel into the combustion chambers. A fuel passage (e.g., a tube or cylindrical passage) extends through the stem to supply the fuel from the inlet fitting to the nozzle. Appropriate valves and/or flow dividers can be provided to direct and control the flow of fuel through the nozzle. The fuel injectors are often placed in an evenly-spaced annular arrangement to dispense (spray) fuel in a uniform manner into the combustion chamber. Additional concentric and/or series combustion chambers may each include their own arrangements of nozzles that can be supported separately or on common stems. The fuel provided by the injectors is mixed with air and ignited, so that the expanding gases of combustion can, for example, move rapidly across and rotate turbine blades in a gas turbine engine to power an aircraft, or in other appropriate manners in other combustion applications.

SUMMARY OF INVENTION

The present invention provides a fuel injector having particular application in a gas turbine engine of an aircraft, and more particularly, a unique fuel swirler and/or unique outer air swirler for the fuel nozzle of the fuel injector.

The fuel swirler may provide one or more advantages including uniform spray for providing increased mixture homogeneity, more efficient combustion, and improved flame stability while minimizing recirculation zones along the fuel flow path and reducing the potential for fuel rich zones which can lead to hot-spotting; reducing residence time as fuel enters the fuel swirler; minimizing flow disruptions, boundary layer growth, and/or pressure drop as fuel flows along the fuel swirler; reducing coking internally of the nozzle; reducing thermal stresses; and/or providing a design that is simple and low-cost to manufacture.

The outer air swirler may provide one or more advantages including improved atomization and spray uniformity with a wide spray angle; enhanced effective area of air intakes for minimizing flow disruptions and enhancing flow performance; streamlined contours or other structural features for reducing flow disruptions; and/or providing a design that may be integral and unitary with the fuel swirler.

According to an aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and one or more fuel flow passages extending from the fuel manifold to the outlet section; wherein each of the one or more fuel flow passages has a cross-sectional area transverse to a direction of fluid flow in which the cross-sectional area converges as the fuel flow passage extends from the fuel manifold toward the outlet section.

According to another aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and a plurality of fuel flow passages extending from the fuel manifold to the outlet section; wherein each of the plurality of fuel flow passages includes an inlet opening that opens into the fuel manifold, the inlet opening of each one of the plurality fuel flow passages being contiguous with the inlet opening of another one of the plurality of fuel flow passages.

According to another aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and one or more fuel flow passages extending from the fuel manifold to the outlet section; wherein each of the one or more fuel flow passages includes an inlet opening that opens through a radially inwardly extending wall of the fuel manifold, and a portion of the radially inwardly extending wall of the fuel manifold protrudes inwardly toward the center of the fuel manifold.

According to another aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and a plurality of fuel flow passages extending from the fuel manifold to the outlet section; wherein the fuel swirler body includes a plurality of windows extending through the fuel swirler body for reducing stresses, the plurality of windows being located between the plurality of fuel flow passages.

According to another aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and one or more fuel flow passages extending from the fuel manifold to the outlet section; wherein the fuel swirler body has an axially extending notch at an axial upstream end thereof for stress reduction, the notch being circumferentially spaced apart from and opposite the fuel manifold.

According to another aspect of the invention, an outer air swirler for a fuel nozzle for a gas turbine engine includes: a first outer air swirler portion and a second outer air swirler portion radially inward of the first outer air swirler portion; wherein the first and second outer air swirler portions each include a plurality of air flow passages having air inlets at an upstream portion thereof; and wherein the air inlets of the first outer air swirler portion are axially offset from the air inlets of the second outer air swirler portion.

According to another aspect of the invention, an air swirler for a fuel nozzle for a gas turbine engine includes: a radially outer shroud defining an outer wall, a radially inner shroud defining an inner wall, and swirler vanes that together with the outer wall and inner wall define the plurality of air passages; wherein an upstream edge of the radially outer shroud flares radially outwardly relative to a downstream portion of the outer shroud for enhancing the effective area of air inlets.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

DETAILED DESCRIPTION

The principles of the present invention have particular application to fuel injectors and nozzles for gas turbine engines, such as airblast fuel nozzles, and thus will be described below chiefly in this context. It will of course be appreciated, and also understood, that the principles of the invention may be useful in other applications including, in particular, other fuel nozzle applications and more generally applications where a fluid is injected by a nozzle especially under high temperature conditions.

Figure 1:
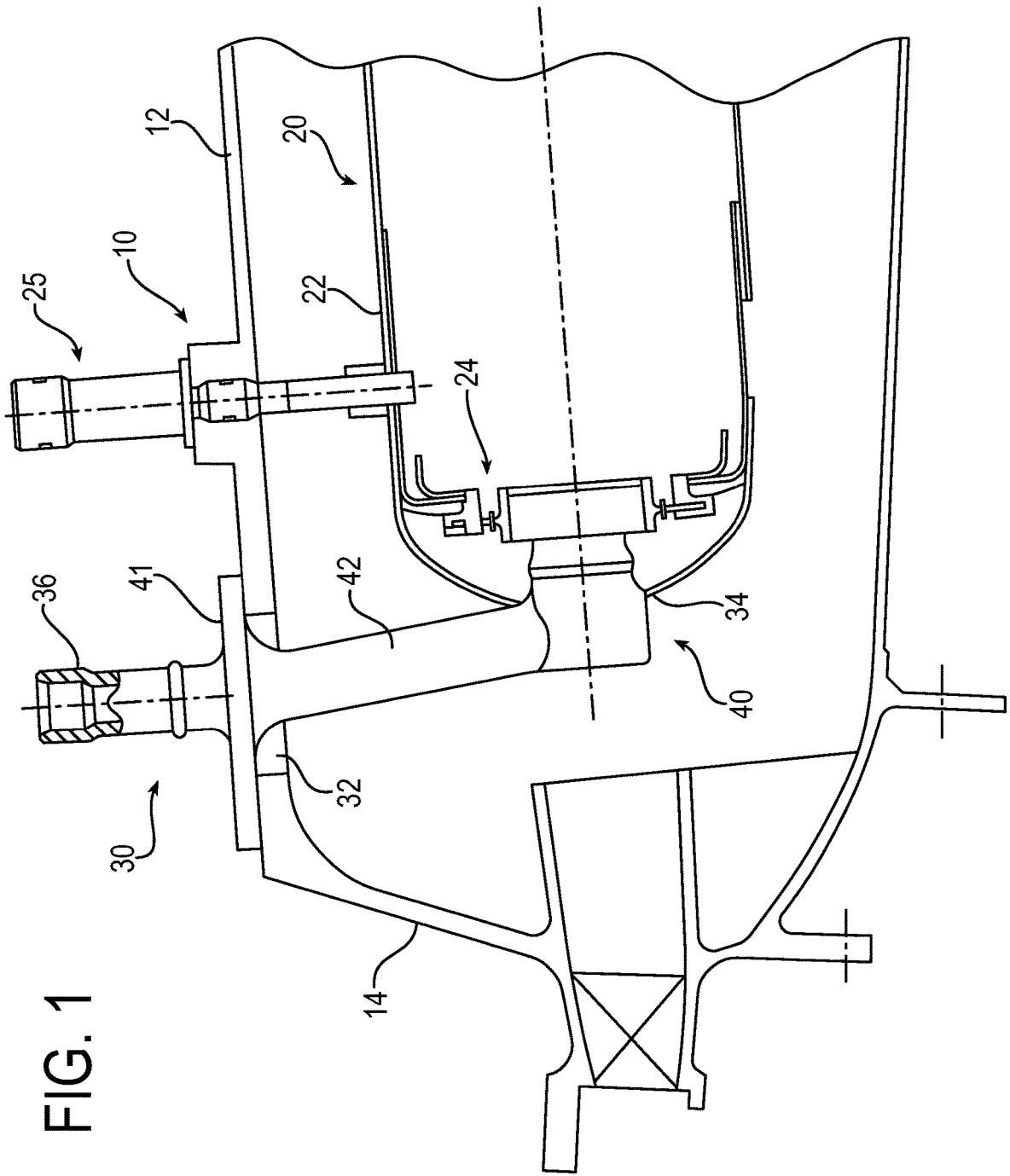
FIG. 1 is a cross-sectional view of a portion of an exemplary gas turbine engine illustrating a fuel injector in communication with a combustor.
Figure 2:
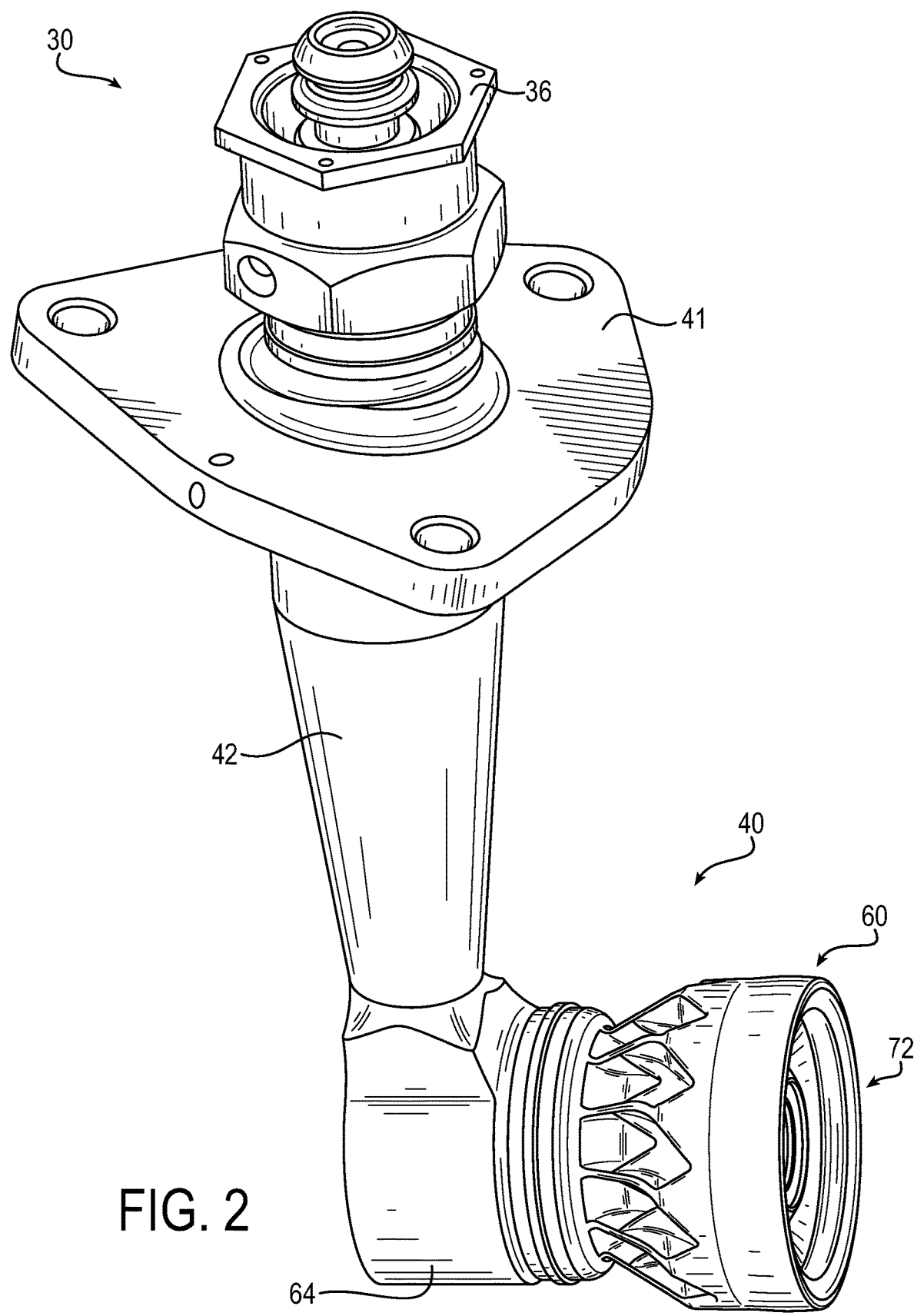
FIG. 2 is a perspective view of an exemplary fuel injector including an exemplary fuel nozzle according to the present invention.

Referring to FIG. 1, a gas turbine engine 10 for an aircraft is shown. The gas turbine engine 10 includes an outer casing 12 extending forwardly of an air diffuser 14. The casing 12 and diffuser 14 enclose a combustor 20 for containment of burning fuel. The combustor 20 includes a liner 22 and a combustor dome 24. An igniter 25 is mounted to the casing 12 and extends inwardly into the combustor 20 for igniting fuel. The above components can be conventional in the art and their manufacture and fabrication are well known.

A fuel injector 30 is received within an aperture 32 formed in the engine casing 12 and extends inwardly through an aperture 34 in the combustor liner 22. The fuel injector 30 includes a fitting 36 exterior of the engine casing 12 for receiving fuel, such as by connection to a fuel manifold or line; a fuel nozzle 40 disposed within the combustor 20 for dispensing fuel; and a housing stem 42 interconnecting and structurally supporting the fuel nozzle 40 with respect to fitting 36. The fuel injector 30 is suitably secured to the engine casing 12, such as via an annular flange 41 that may be formed in one piece with the housing stem 42 proximate the fitting 36. The flange 41 extends radially outward from the housing stem 42 and includes appropriate means, such as apertures, to allow the flange 41 to be easily and securely connected to, and disconnected from, the casing 12 of the engine using, for example, fasteners, such as bolts or rivets. The housing stem 42 has a thickness sufficient to support the fuel nozzle 40 in the combustor when the injector is mounted to the engine, and is formed of material appropriate for the particular application.

Referring to FIGS. 2-4B, the exemplary fuel injector 30 and the exemplary fuel nozzle 40 (also referred to as a tip of the fuel injector, or a fuel nozzle tip) are shown in further detail. As shown, the housing stem 42 includes a central, longitudinally-extending bore 50 extending the length of the housing stem 42. One or more fuel conduits 52, such as a fuel feed tube, may extend through the bore 50 and fluidly interconnects fitting 36 and fuel nozzle 40. The fuel conduit 52 includes an internal passage 54 for the passage of fuel. The fuel conduit 52 is surrounded by the bore 50 of the housing stem 42, and an annular insulating gap 56 is provided between the external surface of the fuel conduit 52 and the walls of the bore 50. The insulating gap 56 provides thermal protection for the fuel in the fuel conduits 52.

Figure 3:
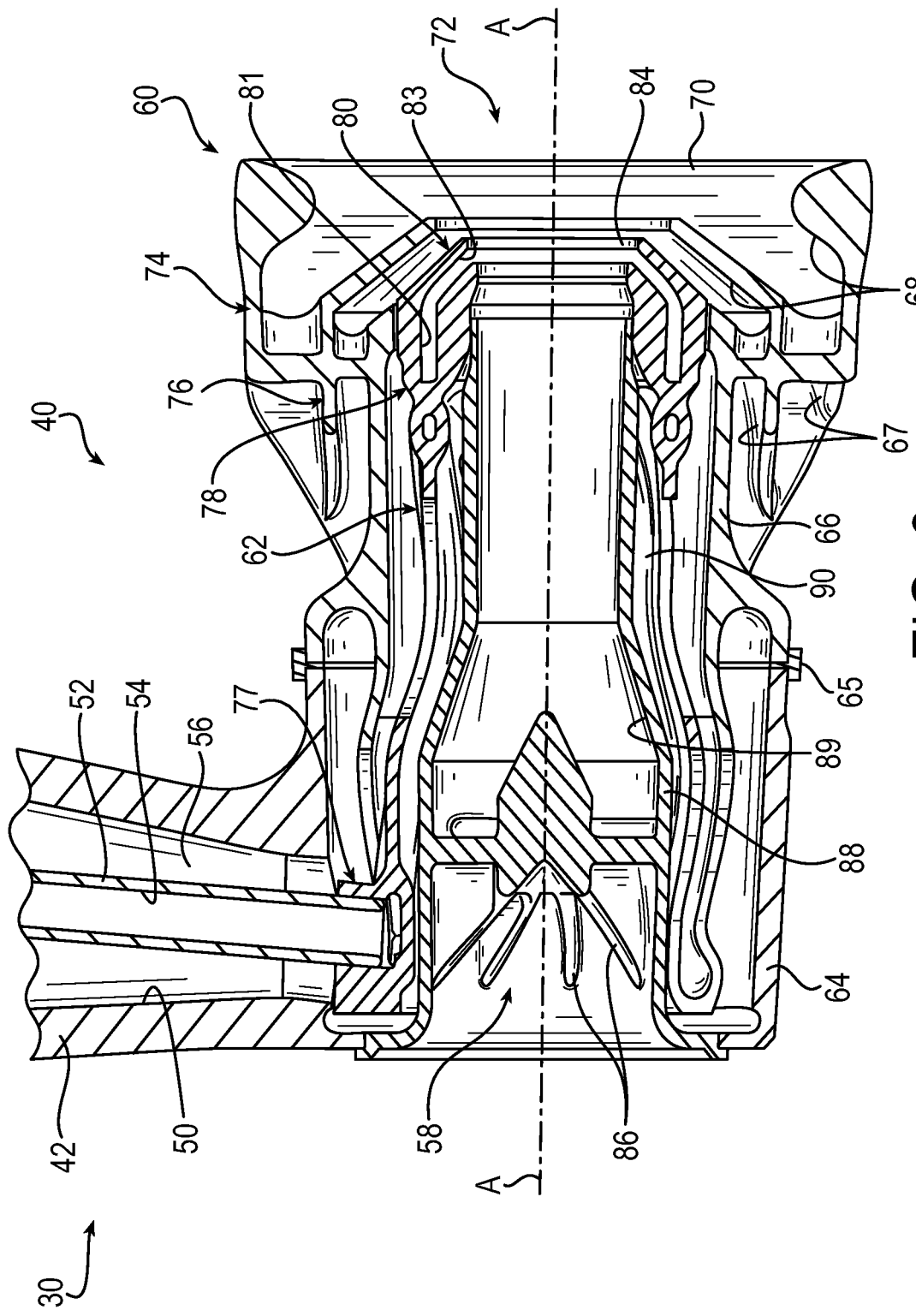
FIG. 3 is a cross-sectional side view of the fuel injector in FIG. 2.
Figure 4A:
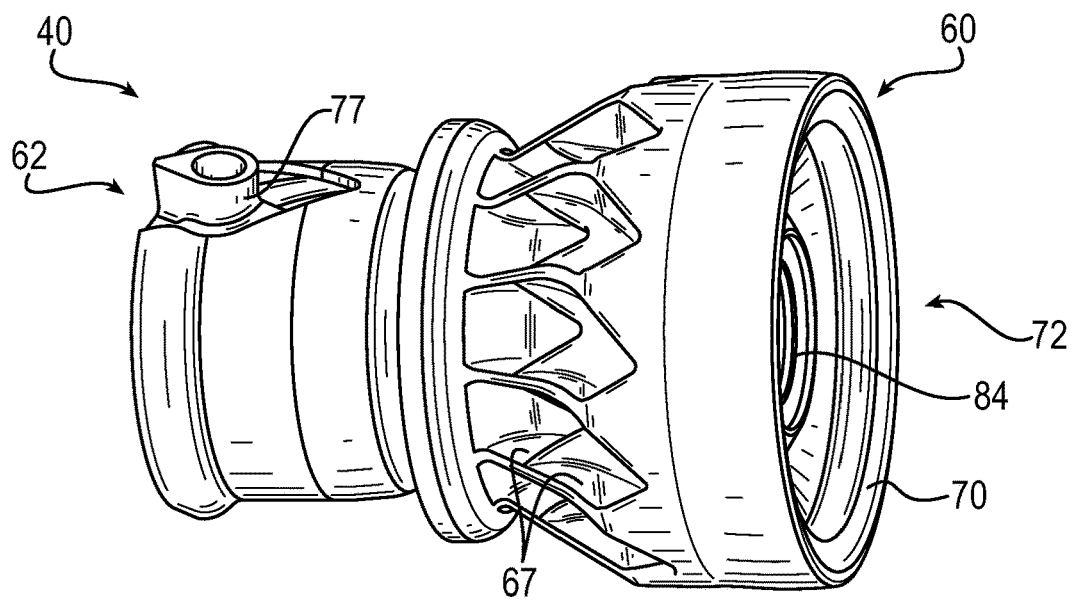
FIGS. 4A and 4B are perspective views of an exemplary fuel nozzle used in the fuel injector, with a stem of the fuel injector and an inner air swirler removed.
Figure 4B:
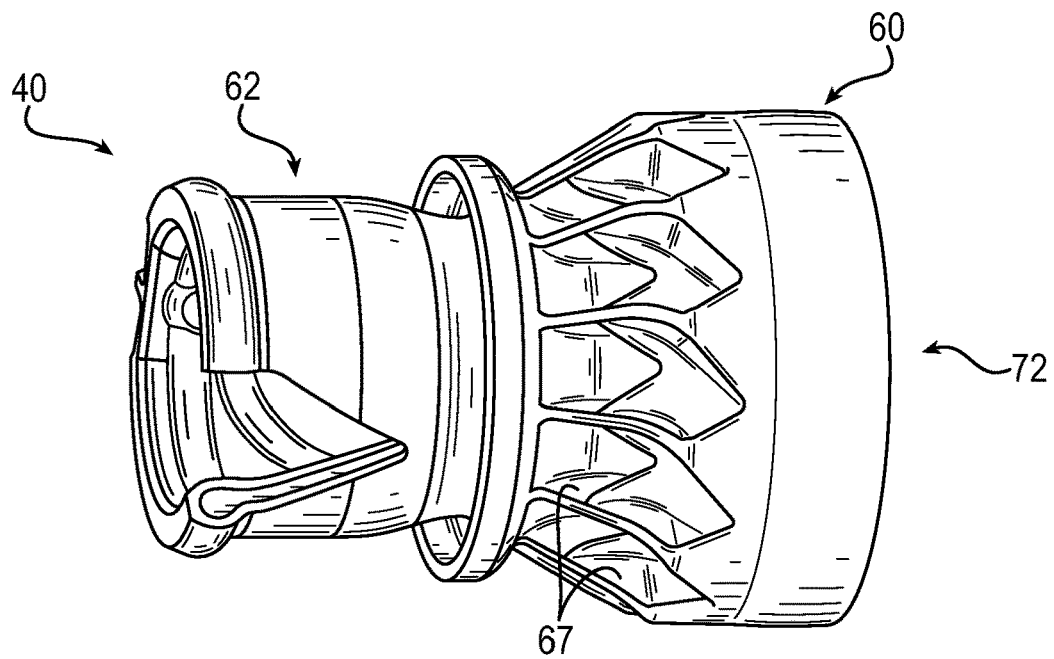
Figure 4C:
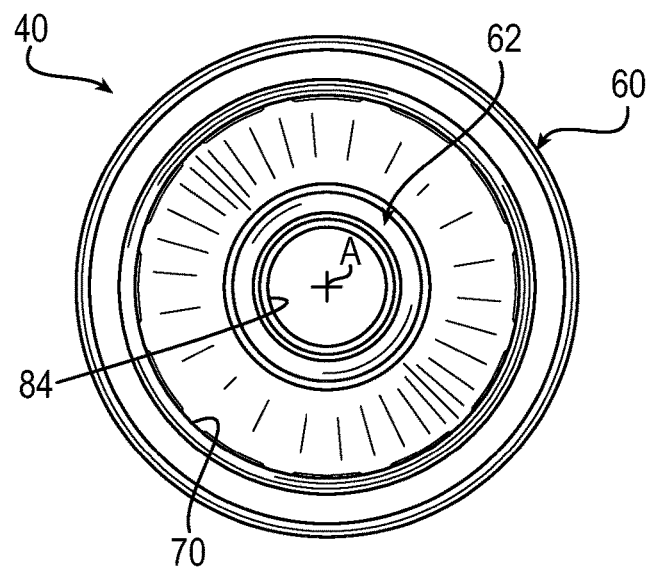
FIG. 4C is a plan view of an outlet end of the fuel nozzle.
Figure 5:
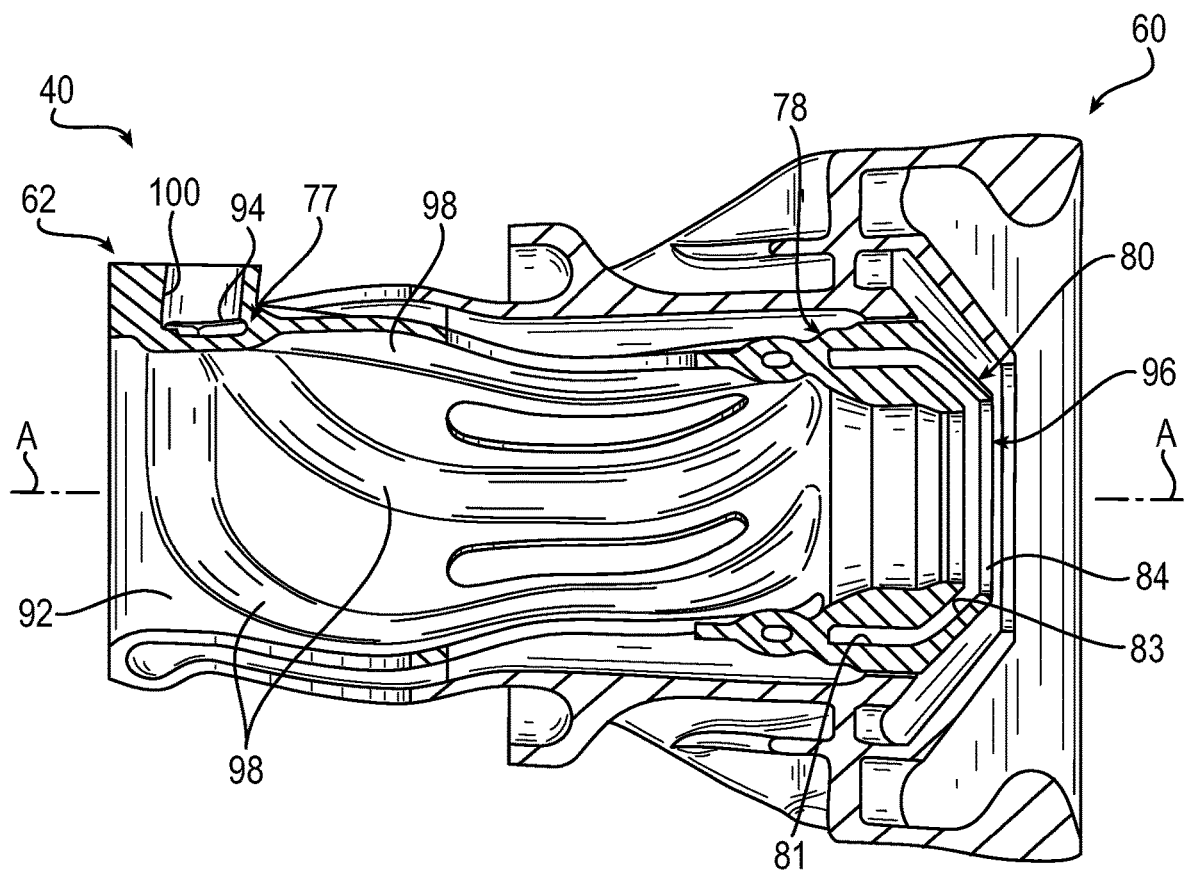
FIG. 5 is a cross-sectional side view of the fuel nozzle.

As shown in greater detail in FIG. 3, the fuel nozzle 40 has a central axis A, and includes an inner air swirler 58, an outer air swirler 60 outwardly surrounding the inner air swirler, and a fuel swirler 62 radially between the inner air swirler 58 and the outer air swirler 60. In the illustrated embodiment, the lower end of the housing stem 42 includes an annular outer shroud 64 of the nozzle 40. The outer shroud 64 is connected at its downstream end to the outer air swirler 60, such as by welding or brazing at 65, or by other suitable means.

The outer air swirler 60 may include an annular wall 66 forming a continuation of the outer shroud 64 of the housing stem 42. The outer air swirler 60 may include a plurality of swirler vanes 67 and at least one internal airflow guide surface 68 tapered radially inwardly at its downstream end 70 to direct air in a swirling manner toward the central axis A at a downstream discharge end 72 of the nozzle 40. As shown in the illustrated embodiment, the outer air swirler 60 may include a first outer air swirler portion 74 and a second outer air swirler portion 76, in which the first (dome) air swirler portion 74 is located radially outward of the second (inner) air swirler portion 76. As discussed in further detail below, each outer air swirler portion 74 and 76 may include a plurality of vanes 67 and inwardly-directed annular downstream portions to direct the air flows in a swirling and converging manner toward the central axis A and toward the downstream end of the fuel swirler.

The fuel swirler 62 generally receives fuel from the fuel conduit 52 at an upstream inlet section 77, and then dispenses the fuel in swirling motion at a downstream outlet section 78. As shown, the fuel swirler 62 may include a prefilmer 80 at its downstream outlet section 78. In exemplary embodiments, the prefilmer 80 has an axially extending swirl annulus 81 at its upstream side for receiving swirling fuel from the fuel swirler 62, and a tapered portion 83 at its downstream side that tapers radially inwardly toward a discharge end 84 to direct fuel in a swirling manner toward the central axis A at the discharge end 72 of the nozzle 40. The downstream tapered portion 83 of the prefilmer may assist the fuel in forming a thin, continuous sheet across the prefilmer surface, and in accelerating the fuel as the fuel passes downstream along the surface. The prefilmer 80 may be disposed radially inwardly and upstream of the downstream end 70 of the outer air swirler 60, such that the outer air swirler 60 directs air flow with a radially inwardly swirling component of motion downstream of the fuel dispensed from the prefilmer 80.

Fuel dispensed from the prefilmer 80 also preferably interacts with air passing the inner air swirler 58. The inner air swirler 58 preferably is surrounded by the fuel swirler 62 and the outer air swirler 60. In the illustrated embodiment, the inner air swirler 58 is located upstream of the discharge end 84 of the prefilmer 80 and includes a series of circumferentially spaced, vanes 86 designed to direct air in a swirling manner upstream of the prefilmer 80 and toward the discharge end 72 of the nozzle 40. The vanes 86 may be curved and oriented tangentially with respect to the central axis A of the nozzle 40 to promote swirling. The number, orientation and location of the vanes 86 can vary depending upon the desired air flow. The axial length of the vanes 86 and the passages between the vanes can also be changed to increase (or decrease) the amount of air passing through the inner air swirler.

As shown, the inner air swirler 58 has an inner annular wall 88 that is disposed radially inwardly of the fuel swirler 62. The inner annular wall 88 has a radially inner surface bounding an air passage (duct) 89 in which the radially-extending vanes 86 are provided. In exemplary embodiments, the annular wall 88 has a streamlined geometry with the flow area of the air passage 89 decreasing in the direction of flow. This minimizes boundary layer growth and prevents boundary layer separation of the air flow. The annular inner wall 88 also acts as a heat shield that extends centrally within the nozzle 40. For example, the inner wall 88 and the fuel swirler 62 respectively form an insulating gap 90 therebetween that functions to protect the fuel from elevated temperatures. In exemplary embodiments, the insulating gap 90 may be connected by suitable passage(s) in the nozzle 40 to the insulating gap 56 of the housing stem 42 for venting, if desired.

Turning now to FIGS. 5-8, the fuel swirler 62 is shown in further detail. The fuel swirler 62 includes a fuel swirler body 92 extending along the longitudinal axis A between the upstream inlet section 77 and the downstream outlet section 78 of the fuel swirler. The inlet section 77 is configured to receive a source of fuel from the conduit 52 and includes a fuel manifold 94 for fluid communication with the fuel source. The outlet section 78 may include the prefilmer 80 and is configured to dispense the fuel from an outlet end 96 of the fuel swirler 62. A plurality of fuel channels or fuel flow passages 98 fluidly interconnect the fuel manifold 94 with the outlet section 78 of the fuel swirler.

As shown in the illustrated embodiment, the fuel manifold 94 may be formed within the body 92 of the fuel swirler at the upstream inlet section 77, and may have an outward opening 100 for receiving the fuel conduit 52. The manifold 94 extends radially inwardly into a depth of the body 92, and has an inward surface, or inner wall 102, that defines a generally circular configuration of the manifold in the illustrated embodiment. It is understood that the manifold 94 could have other configurations, such as polygonal, trapezoidal, rectangular, etc., with the flow area, dimensions, and configuration of the manifold being determined by the volume and pressure of the fluid entering the nozzle, and preferably being sized and configured to improve flow performance, such as by reducing stagnation flow, reducing residence time of the fuel in the manifold to reduce coking, etc.

The inner wall 102 of the manifold 94 preferably has a protruding portion 104 that is configured to protrude inwardly toward the center of the manifold for balancing the flow to the various fuel passages 98. In the illustrated embodiment, the protruding portion 104 is a V-shaped protrusion located toward the upstream end portion of the fuel swirler body 92 (e.g., the 6 o'clock position).

As best shown in FIG. 6, each of the plurality of fuel flow passages 98 has an upstream inlet portion having an inlet opening 106 that opens through the inner wall 102 of the fuel manifold 94. In the illustrated embodiment, the inlet opening 106 of each one of the plurality fuel passages 98 is immediately adjacent to and/or contiguous with the inlet opening 106 of another one of the plurality fuel passages 98, such that the fuel passage inlet openings 106 are arranged around the manifold 94 either without a separation wall at the manifold boundary, or with a minimal streamline-contoured guide wall shared with the manifold boundary. This minimizes residence time of the fuel in the manifold, which may minimize coking, and also may reduce flow disruptions as the fuel passes through the manifold to the fuel passages to reduce pressure drop.

More particularly, the fuel wetted surfaces of the manifold 94 and fuel passage inlet openings 106 may be continuously and smoothly contoured to follow the fuel flow streamlines to minimize the disruptions of fuel flow. The manifold 94 and fuel passage inlet openings 106 also may be configured to have a sufficient dimension and/or sufficient number of passages such that fuel can enter the manifold and be evenly distributed to each of the passages 98 for distribution by the nozzle without substantial pressure drop.

Figure 7:
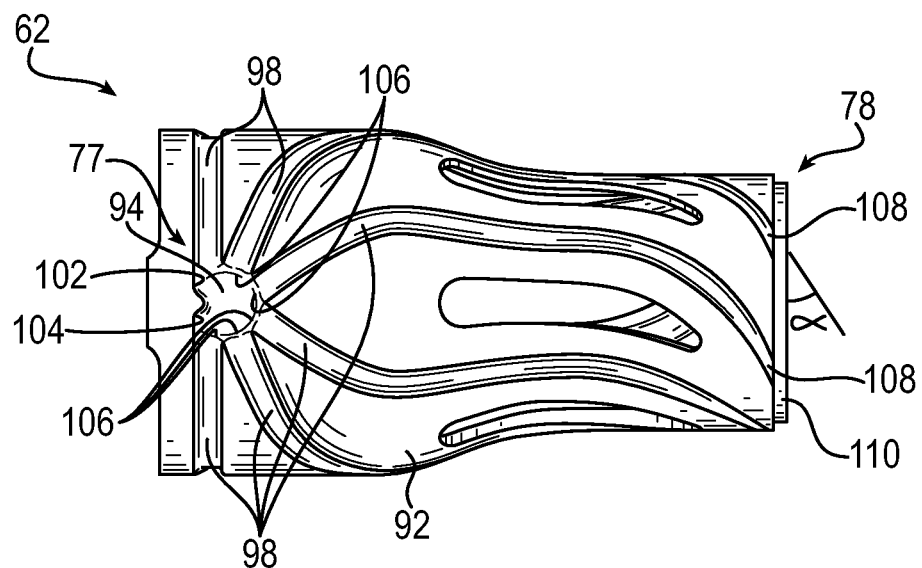
FIG. 7 is a side view of the fuel swirler with a prefilmer section removed from view, and with an outer wall broken away to show an exemplary manifold and exemplary internal flow passages of the fuel swirler.
Figure 8:
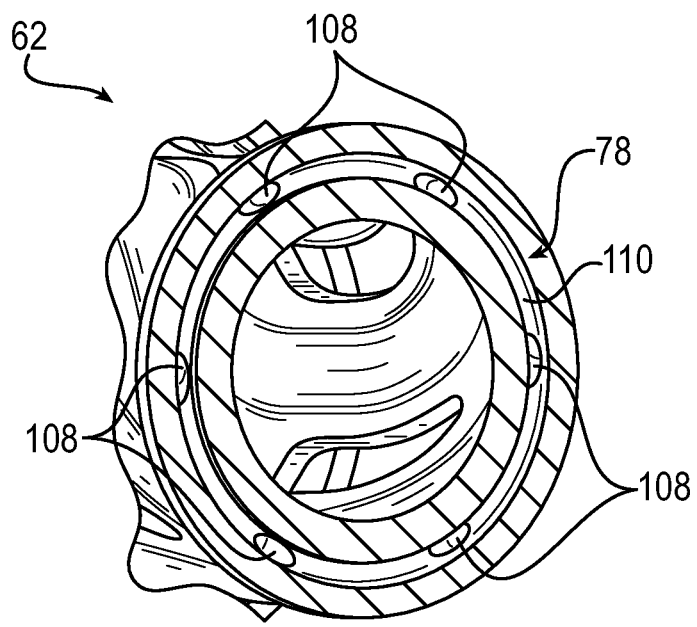
FIG. 8 is a cross-sectional view of the fuel swirler taken along the line 8-8 in FIG. 6A.

Each of the fuel flow passages 98 opening to the manifold 94 extend downstream to their respective outlet ends (outlet openings) 108 for opening into the outlet section 78 of the fuel swirler 62 (as shown in FIGS. 7 and 8, for example). In this manner, each of the fuel flow passages 98 can be described by a flow path having a flow direction and a flow area along the length of the fuel passage between its inlet portion and outlet portion.

In the illustrated embodiment, each of the fuel flow passages 98 extends in the flow path direction along the fuel swirler body 92 with continuously and gradually changing directions to minimize flow disruptions, restrict boundary layer growth and/or reduce pressure drop as the fuel flows from the fuel manifold 94 to the outlet section 78. Preferably the cross-sectional area of the inlet of the fuel passage is two times that of the exit area, i.e., a ratio of two to one, although other ratios ratio can be accommodated. In exemplary embodiments, the fuel flow paths provided by the passages 98 preferably minimize the distance from the fuel manifold 94 to the outlet ends 108 of the passages to reduce residence time of the fuel. In this manner, because the inlet openings 106 may be connected to a single manifold 94 on one side of the fuel swirler body 92, while the outlet ends 108 may be circumferentially spaced apart about the fuel swirler body 92 (as shown), the respective fuel passages 98 may be non-parallel with respect to each other, and may be non-linear, sinuous, curved flow paths that extend along the fuel swirler body 92.

In the illustrated embodiment, each of the fuel flow passages 98 has a cross-sectional area transverse to a direction of fluid flow that converges (reduces in size) along at least a portion of the fuel flow passage 98 as the fuel passage extends from the fuel manifold 94 toward the outlet section 78 (as best shown in FIG. 7, for example). More particularly, the cross-sectional area of each of the fuel flow passages 98 may be configured to continuously and gradually decrease in area starting from the inlet opening 106 at the fuel manifold 94 to the outlet end 108 at the outlet section 78 of the fuel swirler 62. Such a configuration of the converging cross-sectional area of the fuel passages may reduce boundary layer growth of the fuel flowing through the passage and/or may reduce pressure drop.

In exemplary embodiments, each of the fuel flow passages 98 may have the same cross-sectional area profile from the inlet end to the outlet end of the fuel flow passage. It is understood, however, that one or more of the fuel flow passages 98 may have a different cross-sectional area profile along the flow path direction from other one(s) of the flow passages 98, as may be desired for particular applications.

The outlet ends 108 of the fuel passages 98 may be arranged in an annular, evenly spaced apart array around the entire circumference of the outlet section 78 such that fuel may be sprayed uniformly by the nozzle 40 (as best shown in FIG. 8, for example).

In the illustrated embodiment, the fuel swirler 62 includes the prefilmer 80 at the outlet section 78, and the outlet ends 108 of the fuel passages 98 open into the swirl annulus 81 of the prefilmer 80 through an upstream edge 110 of the swirl annulus 81.

In exemplary embodiments, the outlet ends 108 of the fuel passages are inclined at an angle (α) relative to a plane perpendicular to the longitudinal axis A of the fuel swirler body, and are also inclined in the circumferential direction around the longitudinal axis A, so as to provide the fuel with a swirling component of motion as it is discharged into the swirl annulus 81. In this manner, the particular angle of the outlet ends 108 may vary depending upon the desired swirl for the fuel.

In exemplary embodiments, each of the outlet ends 108 of the fuel passages 98 is configured as a metering slot 108 (with the same reference numeral 108 used to refer to both the outlet end and metering slot for clarity). The metering slots 108 may be configured to meter the amount of fuel flowing through the passages 98 and/or direct the fuel at the discharge end of the fuel swirler 62 in a particular manner. The metering slots 108 may thus provide improved flow uniformity as the fuel is discharged from the fuel swirler 62, which may reduce recirculation zones and hot spotting, thereby improving the lifespan of the turbine.

In the illustrated embodiment, the metering slots 108 are configured as a continuation of the terminal portions of the flow passages 98 and have a cross-sectional area that converges (reduces in size) as the metering slot 108 extends toward the outlet section 78. Such a converging configuration of the metering slots 108 may minimize flow disruptions and improve flow uniformity as the fuel is discharged from the outlet end. It is understood that although the metering slots 108 are shown in the illustrated embodiment as being a continuation of the fuel passages 98, the metering slots 108 may extend below the edge 110 at the outlet section 78, and have a different cross-sectional area profile, different shape or configuration, and/or different angle than the upstream adjacent portion of the fuel passage 98. For example, in exemplary embodiments, the metering slots 108 may have a cross-sectional area that is uniform as the metering slot extends toward the outlet section. In addition, although each of the metering slots 98 is shown with the same cross-sectional area, and each is shown angled and oriented in the same direction, it is understood that one or more of the metering slots 98 may have different cross-sectional areas, angles, or orientations from other one(s) of the metering slots. Such differing configurations may be used to increase/decrease the amount of swirling of the fuel and/or to increase/decrease the velocity of the fuel exiting the orifices for staging the fuel, as may be desired for particular applications.

As shown, the outlet ends 108 (e.g., metering slots) of the fuel passages 98 commonly open into the swirl annulus 81 of the prefilmer 80 and provide a swirling motion of flow to direct fuel towards the tapered portion 83 of the prefilmer 80. As noted above with reference to FIG. 3, the prefilmer 80 is disposed downstream of the inner air swirler 58 and upstream of the outer air swirler 60. Thus, while the fuel streams may be discharged radially outward and axially downstream from the outlet ends 108 of the fuel passages 98 (in a swirling flow) against the prefilmer surface 83; the air flow through the swirler vanes 67 of the outer air swirler 60 may at the same time be directed radially inward with a swirling inner air flow. The aerodynamic drag forces from the air/fuel interface may accelerate the fuel, to assist distributing the fuel evenly in a thin sheet across the prefilmer surface. The air flow from the inner air swirler 58 passes inwardly of the fuel streams to form a swirling, inner air flow centrally of the fuel sheet to aid the atomization of the fuel downstream from the prefilmer discharge end 84. As the fuel sheet releases from the downstream lip of the prefilmer surface 83, the sheet is impacted by the converging air from the outer air swirler 60 (e.g., including first air swirler portion 74 and second air swirler portion 76), and the inner air flow provided by the inner air swirler 58. As a result, a fairly significant velocity gradient is established at the prefilmer lip that results in a high shear rate at the locations where the incoming fuel streams impinge. As is preferred, the sheet is quickly atomized into a fine dispersion, and is evenly distributed in a conical spray. This enables the nozzle 40 to provide good spray performance, a wide spray angle, and improved spray uniformity with essentially no streaks, voids or non-homogeneities.

In the illustrated embodiment, the fuel swirler body 92 is formed as a monolithic (unitary) and seamless construction, including the inlet section 77 having the manifold 94, the plurality of fuel passages 98, and the prefilmer 80 at the outlet section 78. In this manner, the fuel flow passages 98 may be formed as internal passages enclosed by portions of the fuel swirler body 92. The fuel swirler 62 also may include one or more structural features that reduce thermal stresses and improve the longevity of the fuel swirler.

Figure 6A:
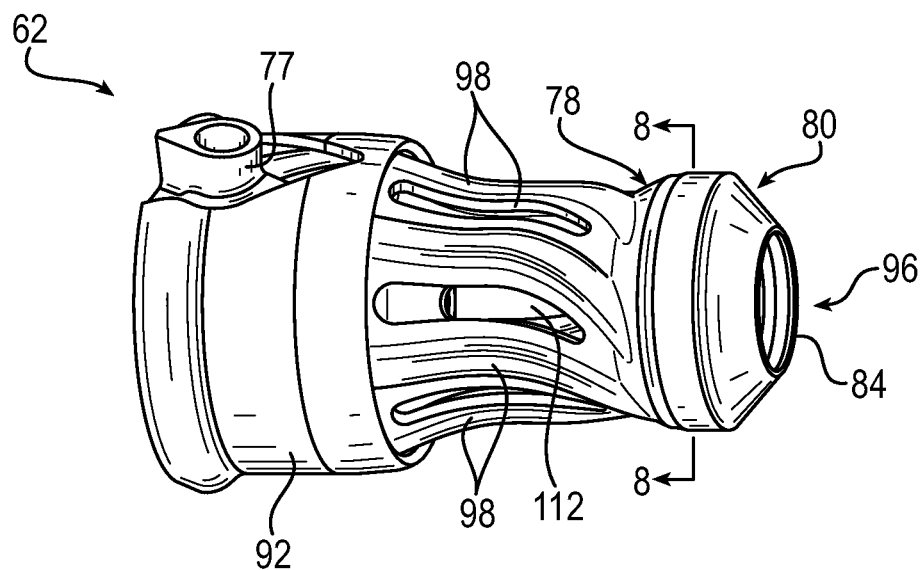
FIGS. 6A and 6B are perspective views of an exemplary fuel swirler of the fuel nozzle, according to the present invention.
Figure 6B:
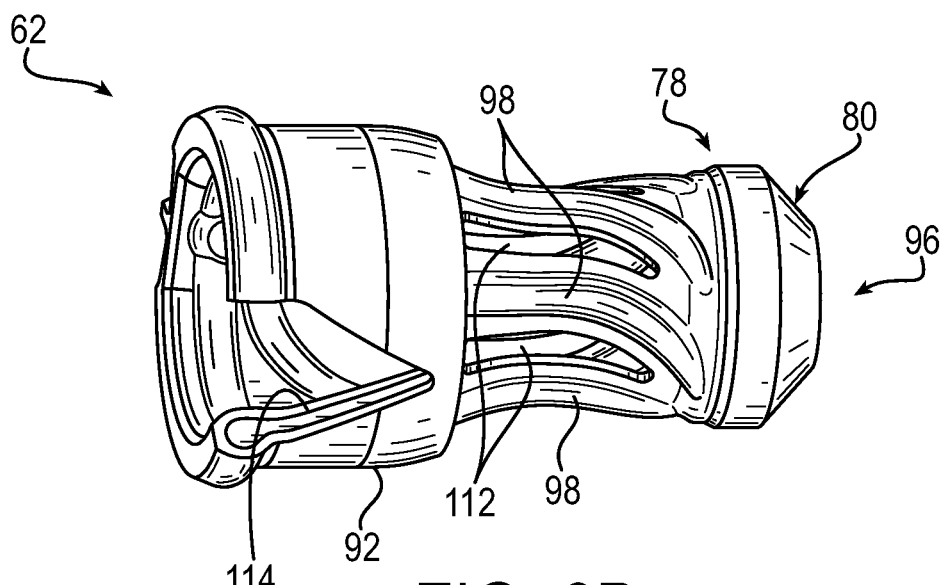

For example, in exemplary embodiments, the fuel swirler body 92 includes a plurality of windows 112 (e.g., apertures) that extend through the fuel swirler body 92 between adjacent flow passages 98 for reducing stresses while also reducing weight and cost of the fuel swirler 62 (as shown in FIGS. 6A and 6B, for example). Alternatively or additionally, the fuel swirler body 92 may have one or more stress-relieving notches 114 in the body. For example in the illustrated embodiment, the notch 114 is an axially extending V-shaped notch formed in the upstream axial end of the body 92, in which the notch 114 is circumferentially spaced apart from and opposite the fuel manifold 94.

The fuel swirler 62 may be formed from an appropriate heat-resistant and/or corrosion resistant material as would be understood by those having ordinary skill in the art. In exemplary embodiments, the fuel swirler 62, including the fuel manifold 94, fuel passages 98, inlet openings 106, outlet openings/metering slots 108, windows 112, and/or prefilmer 80 (including swirl annulus 81 and tapered portion 83), etc. may be formed by additive manufacturing methods, such as direct laser deposition, direct metal laser sintering, etc., such that the fuel swirler 62 is of a unitary construction. In exemplary embodiments, such additive manufacturing techniques may provide the as-manufactured surfaces of the fuel swirler 62 (such as those defining the internal fuel passages 98) with a surface roughness that may promote better balancing of the flow between the various fuel passages. Alternatively or additionally, the fuel swirler 62 may be formed using conventional manufacturing techniques, for example, milling, machining, brazing, welding, or the like.

The foregoing features of the exemplary fuel swirler 62 may enable the fuel nozzle 40 to provide good spray performance with improved atomization and minimal pressure drop, a wide spray angle, minimal internal recirculation zones in the fuel passages, and/or improved spray uniformity with essentially no streaks, voids or non-homogeneities, which may provide for efficient combustion and good flame stability for the gas turbine engine. For example, the fuel swirler 62 may include one or more of the following features, alone or in combination: (i) the inner wall 102 of the manifold 94 may have a protruding portion 104 that is configured to protrude inwardly toward the center of the manifold to help balance the flow as the fuel enters the manifold; (ii) the inlet openings 106 of the fuel passages 98 may be immediately adjacent to and/or contiguous with one another for minimizing residence time of the fuel in the manifold, which may minimize coking, and also for reducing flow disruptions as the fuel passes through the manifold to the fuel passages, which may reduce pressure drop; (iii) each of the fuel flow passages 98 may extend along the fuel swirler body 92 with continuously and gradually changing directions, preferably while also minimizing the length of the fuel passage, for reducing boundary layer growth and/or reducing pressure drop; (iv) each of the fuel flow passages 98 may have a cross-sectional area that converges (reduces in size) along at least a portion of the fuel flow passage 98 as the fuel passage extends from the fuel manifold 94 toward the outlet section 78 for reducing boundary layer growth of the fuel flowing through the passage and/or for reducing pressure drop; (v) the metering slots 108 may be configured to meter the amount of fuel flowing through the passages 98 and/or direct the fuel at the discharge end of the fuel swirler 62 for providing improved uniformity as the fuel is discharged from the fuel swirler 62, thereby the temperature pattern factor of the combustor and increasing the lifespan of the turbine; (vi) the fuel swirler body 92 may include windows 112 between adjacent flow passages 98 for reducing stresses while also reducing weight and cost of the fuel swirler 62; (vii) the fuel swirler body 92 may have one or more stress-relieving notches 114 in the body for reducing thermal stresses while also reducing weight; (viii) the surfaces of the fuel swirler 62 (such as those defining the internal fuel passages 98) may have a surface roughness that may promote a desired flow performance, such as better balancing of the flow; and (ix) the fuel swirler body 92 may be made as a seamless unitary construction, such as via additive manufacturing techniques.

Figure 9:
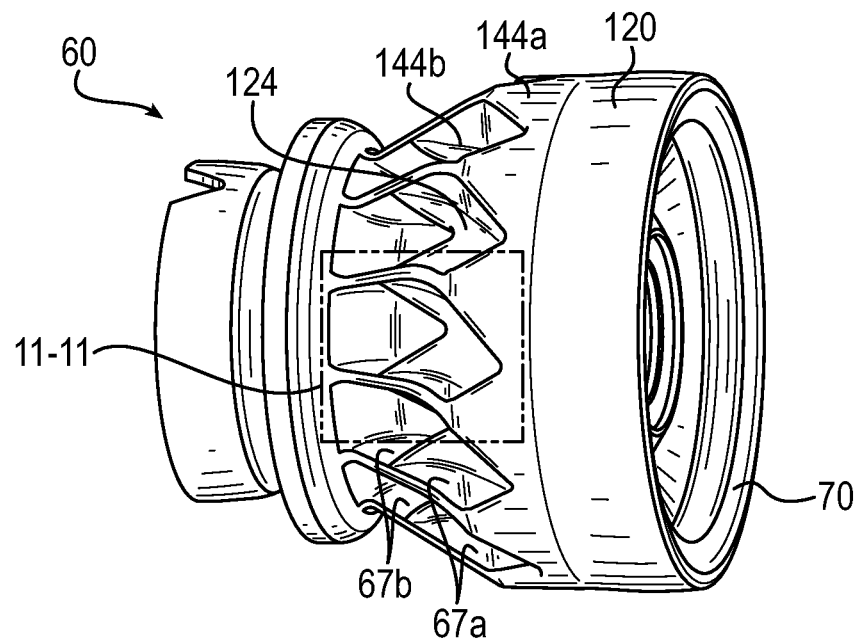
FIG. 9 is a perspective view of an exemplary outer air swirler of the fuel nozzle, according to the present invention.
Figure 10:
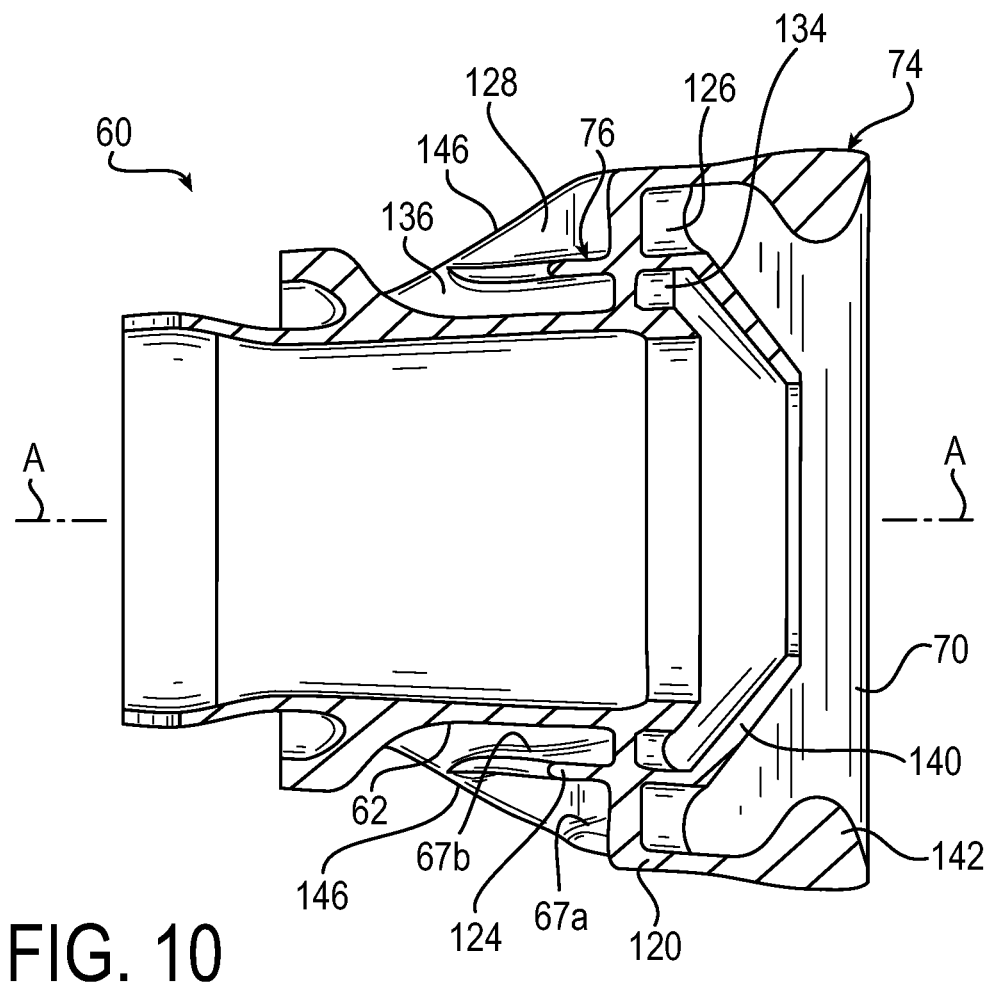
FIG. 10 is a cross-sectional side view of the outer air swirler.
Figure 11:
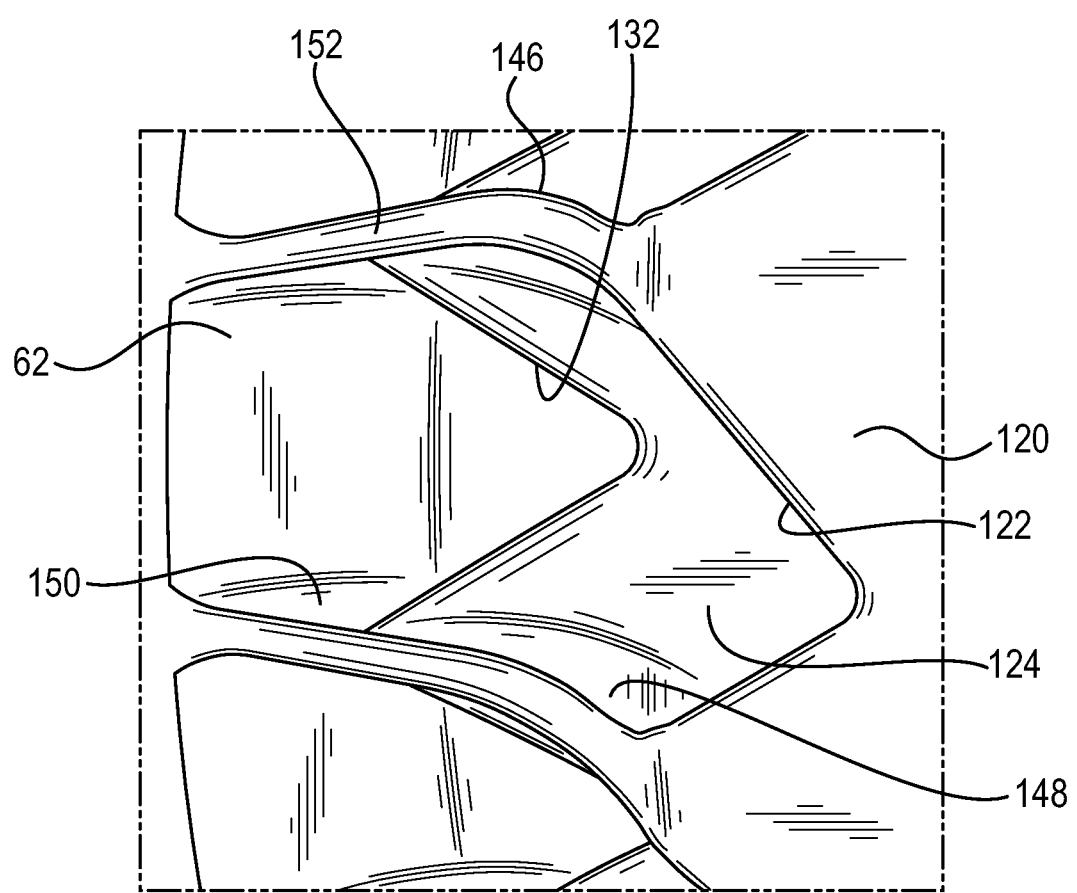
FIG. 11 is an enlarged partial view of the outer air swirler.
Figure 12:
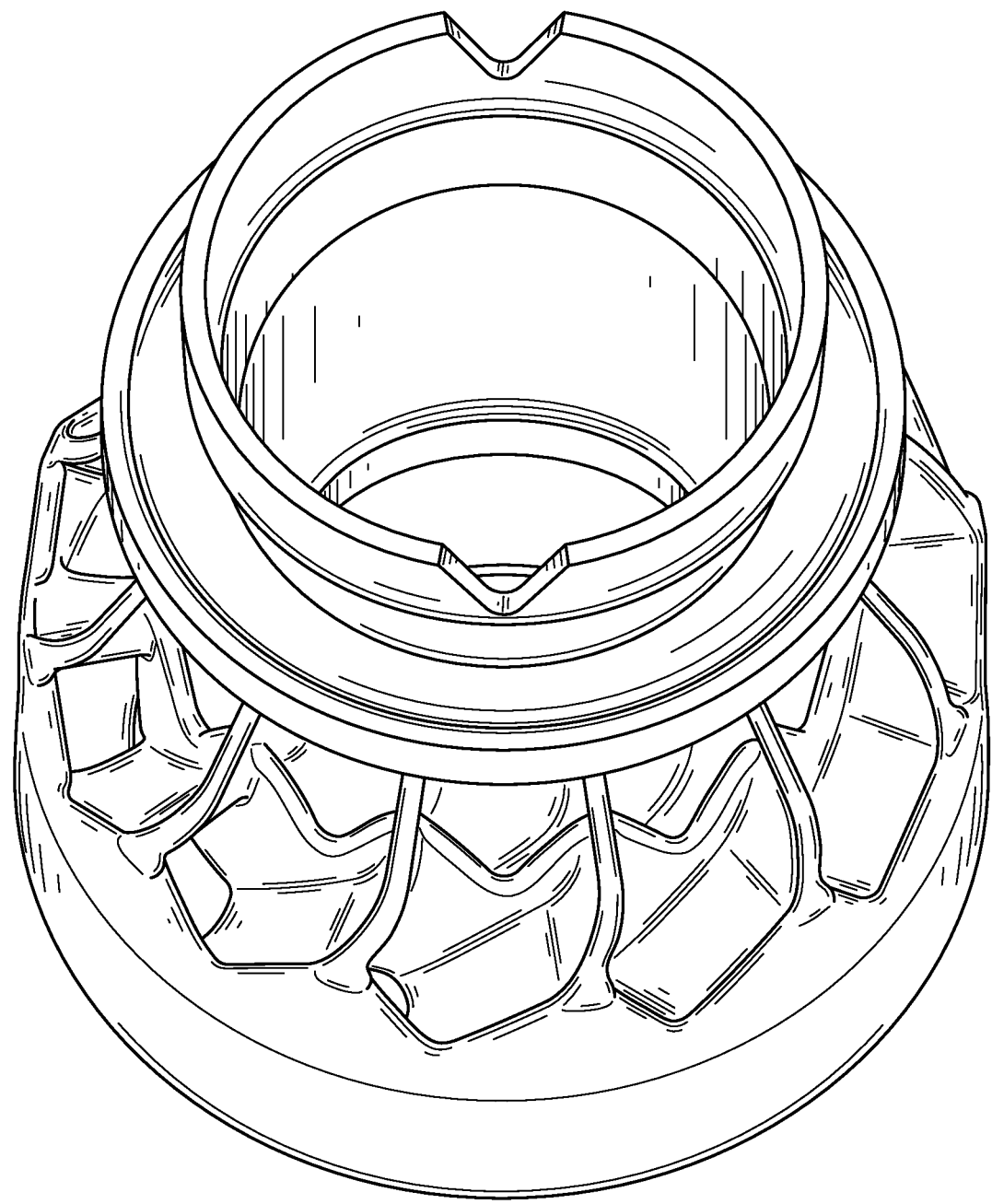
FIG. 12 is an end perspective view of the outer air swirler.
Figure 13:
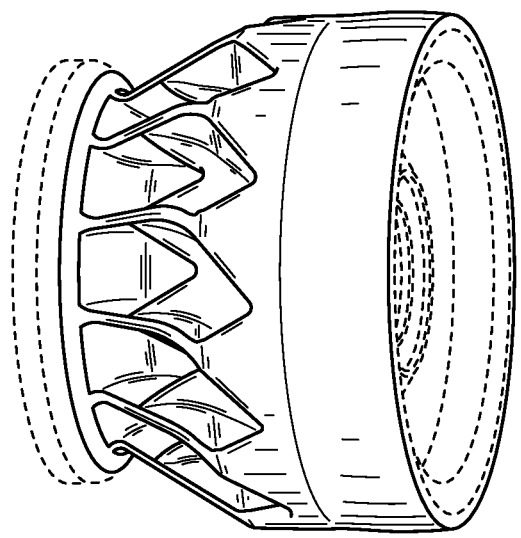
FIGS. 13-15 show additional illustrations of an exemplary ornamental design for the outer air swirler, in which the broken line showing illustrates portions of the outer air swirler that are presently not intended to form a part of the ornamental design.
Figure 14:
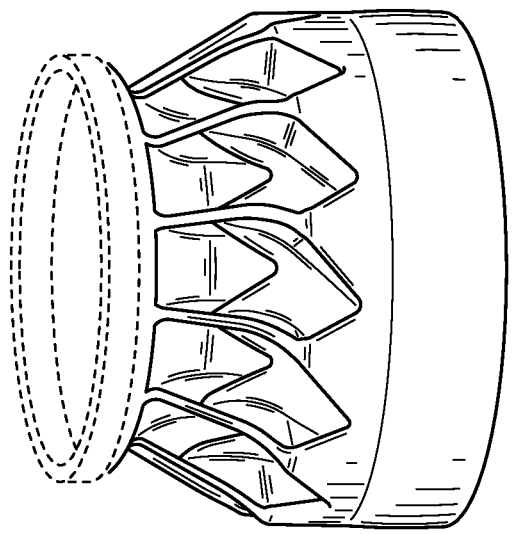
Figure 15:
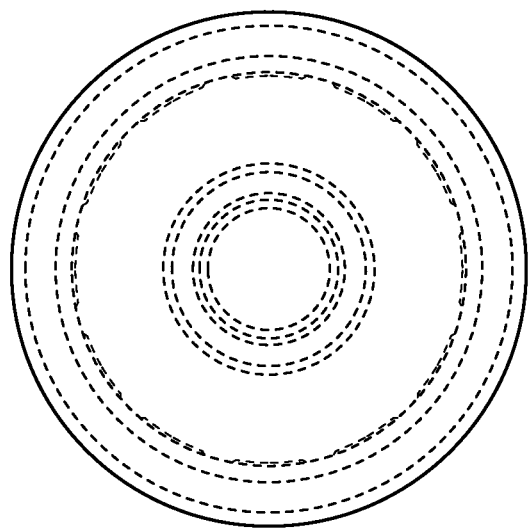

Turning now to FIGS. 9-11, and with reference to FIG. 3, the outer air swirler 60 will be described in further detail. As noted above, the outer air swirler 60 may include one or more outer air swirler portions, such as the first (dome) air swirler portion 74 located concentrically and radially outward of the second (inner) air swirler portion 76. Each air swirler portion 74, 76 includes a plurality of helical, curved or angled vanes 67 (designated in FIGS. 9-11 as 67a for the first air swirler portion 74 and as 67b for the second air swirler portion 76). As discussed above, the respective vanes 67a and 67b are configured to direct the combustion air with a swirling component of airflow along the axis A of the nozzle. In exemplary embodiments, the respective sets of vanes 67a and 67b may be configured to provide co-rotating or counter-rotating air flows of the first outer air swirler portion 74 relative to the second outer air swirler portion 76. The respective vanes 67a, 67b of the outer air swirler 60 also may be co-rotating or counter-rotating with respect to the vanes 86 of the inner air swirler 58. It is understood that the number and/or orientation of the vanes can vary to increase/decrease the direction, speed, or volume of airflow depending upon the particular application, as should be apparent to those having ordinary skill in the art.

In the illustrated embodiment, the first outer air swirler portion 74 includes a radially outer shroud 120 defining an outer wall with an upstream edge portion 122, a radially inner shroud 124 defining an inner wall, and the swirler vanes 67a that together with the outer wall and inner wall define a plurality of air passages 126 having air inlets 128 at their respective upstream ends. The air passages 126 may extend in both the axial and circumferential direction, such that the air passages curve to provide the air with a swirling motion of flow as discussed above.

The second outer air swirler portion 76 may be configured similarly to the first outer air swirler portion 74. In the illustrated embodiment, the radially inner shroud 124 of the first outer air swirler portion 74 forms the radially outer shroud of the second outer air swirler portion 76 (e.g., an intermediate shroud) to define a radially outer wall of the second swirler with an upstream edge portion 132. The second air swirler portion 76 also includes the radially inner shroud 62 (also shown in FIG. 3) defining an inner wall, and the swirler vanes 67b that together with the outer wall and inner wall of the second air swirler define a plurality of air passages 134 having air inlets 136 at their respective upstream ends. Similarly to first air swirler portion 74, the air passages 134 of the second air swirler portion 76 may extend in both the axial and circumferential direction to provide swirling air flow.

As shown, both the radially inner shroud 124 (intermediate shroud) and the radially outer shroud 120 may include inwardly-directed annular downstream portions which then direct the air flows in a converging manner toward the central axis A. The radially inner shroud 124 includes an annular, inwardly tapered (frustoconical) downstream end 140, which may provide the primary outer air flow for atomization of the fuel at the prefilmer discharge end 84 (shown in FIG. 3, for example). The radially outer shroud 120 includes an annular bulbous portion 142, which may provide good spray patternation and adequate droplet dispersion. In this manner, the second (inner) air swirler portion 76 may provide a more focused air flow than the first (dome) air swirler portion 74, but in any case, a relatively wide flow and spray angle may be provided by the airblast portion of the nozzle 40. In exemplary embodiments, the inner shroud 120 and outer shroud 124 direct the respective air flows in a swirling manner at approximately a 45-degree angle to the central axis A. It is understood, however, that the angle and/or direction of flow may vary depending upon the particular application.

In exemplary embodiments, the upstream edges 122, 132 of both the outer shroud 120 and intermediate shroud 124 have a repeating V-shaped pattern, in which the upstream edges 122, 132 flare radially outwardly relative to a downstream portion of the respective shrouds (as shown in FIG. 9 at 144a and 144b, for example). This radially outwardly flared V-shaped edge may enhance the effective area of the respective air inlets 128 and 136, which may enhance air intake and/or minimize flow disruptions. Also as shown, the air inlets 128 of the first outer air swirler portion 74 may be axially offset (e.g., further downstream) from the air inlets 136 of the second outer air swirler portion 76. Such an axially offset configuration also may enhance the effective area and flow performance of the outer air swirler portion(s).

In exemplary embodiments, the outer and inner walls forming the (inner) air passages 126 and (outer) air passages 134 are shaped to direct air partially radially inwardly then generally axially into the swirler vanes 67a, 67b in a continuous and smooth manner. In this manner, separation walls 146 of the swirler vanes may extend radially inwardly from the bottom of the respective V-shaped edge portions 122, 132 to the radially inner wall (e.g., 124 and 62) to form air passage inlet guide surfaces 148, 150 that are streamline-contoured to direct air generally axially then partially tangentially into the swirler vanes in a continuous and smooth manner. As shown, the separation walls 146 and/or the V-shaped edge portions 122, 132 may be formed with a slight taper, and may have respective upstream edges (e.g., at 152) with a smooth full radius such that disruptions to the air flow are minimized.

As discussed above, the respective air passages 126, 134 of the second (inner) and first (dome) air swirler portions 74, 76 may be configured to provide air flow in the same rotational direction (co-rotating) or in opposite rotational directions (counter-rotating). In the illustrated embodiment, the first outer air swirler portion 74 and the second outer air swirler portion 76 are circumferentially aligned, such that the separation walls 146 are shared between the first and second outer air swirler portions, and the respective air flow passages 126, 134 are configured to guide flow in the same direction. In this manner, a single air passage inlet guide can direct air to the full array of air passages that are radially separated by the intermediate shroud, thereby eliminating additional disturbances to the air flow and minimizing the amount of material needed for the airblast fuel nozzle. It is understood, however, that in other embodiments, the first (dome) air swirler portion 74 and second (inner) air swirler portion 76 may be circumferentially offset, in which the respective separation walls are not shared between the first and second outer air swirler portions, such that the respective air inlet guide surfaces of the first and second outer air swirler portions can guide flow independently of one another.

It is understood that although a dual outer air flow swirler 60 is shown, the exemplary nozzle 40 may include three or more outer air swirler portions, each of which could be concentrically arranged in surrounding relation to one another and sharing a common shroud. It is also possible that only a single outer air swirler could be provided, to provide a single swirling, converging air flow. Such outer air swirler configurations should be well apparent to those having ordinary skill in the art.

In the illustrated embodiment, the outer air swirler 60 (including the first (dome) air swirler portion 74 and the second (inner) air swirler portion 76) is formed as a monolithic (unitary) and seamless construction. The outer air swirler 60 may be formed from an appropriate heat-resistant and/or corrosion resistant material as would be understood by those having ordinary skill in the art. In exemplary embodiments, the outer air swirler 60, including the shrouds 120 and 124, vanes 67a and 67b, separation walls 146, and/or air passages 126 and 134, etc. may be formed by additive manufacturing methods, such as direct laser deposition, direct metal laser sintering, etc., such that the outer air swirler 60 is of unitary construction. In exemplary embodiments, such additive manufacturing techniques may provide the as-manufactured surfaces of the outer air swirler (such as air passages 126 and 134) with a surface roughness that may promote a desired air flow balancing. In exemplary embodiments, the outer air swirler 60 may be formed integrally with the fuel swirler 62 as a unitary and seamless structure, such as via additive manufacturing techniques. Alternatively or additionally, the outer air swirler 60 may be formed using conventional manufacturing techniques, for example, milling, machining, brazing, welding, or the like, and may be attached to the fuel swirler 62 by well-known methods.

The foregoing features of the exemplary outer air swirler 60 may enable the fuel nozzle 40 to provide good spray performance, a wide spray angle, and/or improved spray uniformity with essentially no streaks, voids or non-homogeneities, which may provide for efficient combustion and good flame stability for the gas turbine engine. For example, the exemplary outer air swirler 60 may include one or more of the following features, alone or in combination: (i) one or more of the upstream edges 122, 132 of the outer shroud 120 and/or intermediate shroud 124 may flare radially outwardly relative to a downstream portion of the respective shrouds for enhancing the effective area of the respective air inlets, which may enhance air intake and/or minimize flow disruptions; (ii) one or more of the upstream edges 122, 132 of the outer shroud 120 and/or intermediate shroud 124 may have a repeating convex-shaped pattern, such as a V-shaped pattern, for increasing the effective area of the air inlets; (iii) the air inlets 128 of the first outer air swirler portion 74 may be axially offset (e.g., further downstream) from the air inlets 136 of the second outer air swirler portion 76 for enhancing the effective area and minimizing flow interruptions of the air swirler portions; (iv) the first outer air swirler portion 74 and/or the second outer air swirler portion 76 may have air passage inlet guide surfaces 148, 150 that are streamline-contoured to direct air generally axially then partially tangentially into the swirler vanes in a continuous and smooth manner for minimizing flow interruptions; (v) the separation walls 146 and/or the V-shaped edge portions 122, 132 may be formed with a slight taper, and may have respective upstream edges with a smooth full radius for minimizing disruptions to the air flow; (vi) the first outer air swirler portion 74 and the second outer air swirler portion 76 may be circumferentially aligned, such that the separation walls 146 are shared between the first and second outer air swirler portions, and the respective air flow passages 126, 134 are configured to guide flow in the same direction, thereby enabling a single air passage inlet guide to direct air to the full array of air passages that are radially separated by the intermediate shroud, which may eliminate additional disturbances to the air flow and minimize the amount of material needed for the airblast fuel nozzle; (vii) the first outer air swirler portion 74 and second outer air swirler portion 76 may be circumferentially offset, in which the respective separation walls are not shared between the first and second outer air swirler portions, such that the respective air inlet guide surfaces of the first and second outer air swirler portions can guide flow independently of one another; (viii) the surfaces of the outer air swirler 60 may have a surface roughness that may promote a desired flow performance, such as laminar or turbulent flow; and (ix) the outer air swirler 60 may be made as a seamless unitary construction, such as via additive manufacturing techniques, and may be integral and unitary with the air swirler 62.

An exemplary fuel injector for a gas turbine engine of an aircraft having an exemplary fuel nozzle has been described herein. The fuel nozzle includes an exemplary fuel swirler and/or an exemplary outer air swirler. The fuel swirler may include a manifold for receiving fuel from a fuel conduit, and a plurality of fuel passages to direct fuel from the manifold to discharge orifices that direct fuel with swirling flow. The fuel swirler may be configured to provide uniform spray while minimizing recirculation zones; reduce residence time as fuel enters the manifold; minimize flow disruptions, boundary layer growth, and/or pressure drop as fuel flows through the fuel passages; reduces coking internally of the nozzle; reduces thermal stresses; and is simple and low-cost to manufacture. The outer air swirler may include first and second outer air swirler portions with respective vanes and air passages that provide swirling air flow. The outer air swirler may be configured to improve atomization and spray uniformity with a wide spray angle; and minimize flow disruptions for enhancing air flow performance.

According to an aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and one or more fuel flow passages extending from the fuel manifold to the outlet section; wherein each of the one or more fuel flow passages has a cross-sectional area transverse to a direction of fluid flow in which the cross-sectional area converges as the fuel flow passage extends from the fuel manifold toward the outlet section.

Embodiments of the invention may include one or more of the following additional features, separately or in combination.

The cross-sectional area of each of the one or more fuel flow passages may continuously and gradually converge from the fuel manifold toward the outlet section.

Each of the one or more fuel flow passages may extend in a flow path direction along the fuel swirler body, and each flow path may continuously and gradually change direction from the fuel manifold to the outlet section to restrict boundary layer growth.

Each of the one or more fuel flow passages may have a cross-sectional area profile as the fuel flow passage extends from the fuel manifold toward the outlet section, and each of the plurality of fuel flow passages may have the same cross-sectional area profile.

Each of the one or more fuel flow passages may include an outlet end that opens into the outlet section, and the outlet ends may form an array circumferentially spaced apart about a longitudinal axis of the fuel swirler body.

Each of the one or more fuel flow passages may include a metering slot at an outlet end of the fuel flow passage, and the metering slot may be configured to open into the outlet section.

The metering slots may have a cross-sectional area that converges as the metering slot extends toward the outlet section.

The metering slots may have a cross-sectional area that is uniform as the metering slot extends toward the outlet section.

The metering slots may be inclined at a slot angle relative to a plane perpendicular to a longitudinal axis of the fuel swirler body, and may be inclined in the circumferential direction around the longitudinal axis.

The slot angle for each of the metering slots may be the same or may be different.

The cross-sectional area for each of the metering slots may be the same or may be different.

The fuel swirler may further include a swirl annulus at the outlet section, and the metering slots may open into the swirl annulus at a slot angle to provide swirling flow of fuel spray exiting the metering slot.

The fuel swirler may further include a fuel prefilmer at the downstream portion of the fuel swirler body, the fuel prefilmer may have an axially extending swirl annulus at an upstream portion thereof, and a radially inwardly converging portion at a downstream portion thereof, and the fuel prefilmer may be configured to terminate at a downstream prefilmer orifice.

The one or more fuel flow passages may be internal fuel flow passages enclosed by the fuel swirler body.

The fuel swirler body may include a plurality of windows extending through the fuel swirler body for reducing stresses, the plurality of windows being located between the plurality of fuel flow passages.

The fuel swirler body may be a monolithic seamless construction, including a fuel prefilmer at the downstream portion of the fuel swirly body.

The fuel swirler body may have an axially extending notch at an axial upstream end thereof for stress reduction, the notch being circumferentially spaced apart from and opposite the fuel manifold.

Each of the one or more fuel flow passages may include an inlet opening that opens into the fuel manifold, the inlet opening of each one of the one or more fuel flow passages being contiguous with the inlet opening of another one of the one or more fuel flow passages.

Each of the one or more of fuel flow passages may include an inlet opening that opens through a radially inwardly extending wall of the fuel manifold, and a portion of the radially inwardly extending wall of the fuel manifold may protrude inwardly toward the center of the fuel manifold.

The portion of the wall protruding radially inwardly toward the center of the manifold may be a V-shaped protrusion.

The V-shaped protrusion may be located toward the upstream end portion of the fuel swirly body.

According to another aspect of the invention, a fuel nozzle for a gas turbine engine may include: a tip encompassing a central axis and including an inner air swirler, an outer air swirler outwardly surrounding the inner air swirler, and a fuel swirler having one or more of any of the preceding features and/or one or more of any of the following features, separately or in combination, wherein the fuel swirler is radially interposed between the inner air swirler and the outer air swirler; the fuel nozzle further including: a fuel feed tube configured to direct a source of fuel radially inward toward the central axis; and a housing at least partially enclosing the tip and the fuel feed tube.

In some embodiments, the inner air swirler may include an axially extending air flow passage, and a plurality of vanes extending into the air flow passage, the plurality of vanes being configured to direct a first air flow with a swirling component of motion.

According to another aspect of the invention, a fuel nozzle for a gas turbine engine may include: an inner air swirler, an outer air swirler outwardly surrounding the inner air swirler, and a fuel swirler having one or more of any of the preceding features and/or one or more of any of the following features, separately or in combination, wherein the fuel swirler is radially interposed between the inner air swirler and the outer air swirler.

Embodiments may include one or more of the following additional features, separately or in combination.

The outer air swirler may include a first outer air swirler portion and a second outer air swirler portion radially inward of the first outer air swirler portion.

The first and second outer air swirler portions may each include a plurality of air flow passages having air inlets at an upstream portion thereof; and the air inlets of the first outer air swirler portion may be axially offset from the air inlets of the second outer air swirler portion.

The air inlets for the second outer air swirler portion may be axially upstream of the air inlets for the first outer air swirler portion.

The first outer air swirler portion may include a radially outer shroud defining an outer wall with a repeating V-shaped upstream edge portion, a radially inner shroud defining an inner wall, and swirler vanes that together with the outer wall and inner wall define the plurality of air passages of the first outer air swirler portion, wherein the outer wall and inner wall are shaped to direct air partially radially inwardly then generally axially into the swirler vanes in a continuous and smooth manner, and separation walls of the swirler vanes extend radially inwardly from the bottom of the V-shaped edge portion and the inner wall to form a plurality of air passage inlet guide surfaces which are streamline-contoured to direct air generally axially then partially tangentially into the swirler vanes in a continuous and smooth manner.

The separation walls and/or the V-shaped edge portions may be formed with a slight taper, and may have respective upstream edges with a smooth full radius such that disruptions to the air flow are minimized.

The plurality of air passage inlet guide surfaces of the first outer air swirler portion may extend in the axial and circumferential direction, such that the air passages are curved when viewed at a plane parallel to a longitudinal axis of the outer air swirler.

The second outer air swirler portion may include a radially outer shroud defining an outer wall with a repeating V-shaped upstream edge portion, a radially inner shroud defining an inner wall, and swirler vanes that together with the outer wall and inner wall define the plurality of air passages, wherein the radially inner shroud of the first outer air swirler portion forms the radially outer shroud of the second outer air swirler portion.

The first outer air swirler portion and the second outer air swirler portion may be circumferentially aligned, such the respective separation walls are shared between the first and second outer air swirler portions, and the respective air inlet guide surfaces of the first and second outer air swirler portions are configured to guide flow in the same direction.

The first outer air swirler portion and the second outer air swirler portion may be circumferentially offset, such that the respective separation walls are not shared between the first and second outer air swirler portions, and the respective air inlet guide surfaces of the first and second outer air swirler portions can guide flow independently of one another.

The respective air passages of the first and second outer air swirler portions may guide airflow in the same circumferential direction, or in opposite circumferential directions.

The outer air swirler may further include one or more additional outer air swirler portions, the one or more additional outer air swirler portions being radially outward the inner shroud of each additional air swirler portion with the outer shroud of the previous air swirler portion shared, or radially inward with the outer shroud of each additional air swirler portion shared with the inner shroud of the previous air swirler portion.

Each additional air swirler portion may have the same or a different number of air passages as the adjacent air swirler portion.

Two or more radially adjacent air swirler portions may be circumferentially aligned, such that their respective separation walls are also shared between the air swirler portions, and the respective inlet guide surfaces of the air swirler portions can direct air to a full array of air passages that are radially separated by the shared shrouds, thereby reducing additional disturbances to the air flow and minimizing the amount of material for the outer air swirler.

Two or more radially adjacent air swirler portions may be circumferentially offset, such that their respective separation walls are not shared between the air swirler portions, and the respective inlet guide surfaces of the air swirler portions can direct air independently to the full array of air passages that are radially separated by the shrouds.

The first outer air swirler portion may include a radially outer shroud defining an outer wall, a radially inner shroud defining an inner wall, and swirler vanes that together with the outer wall and inner wall define the plurality of air passages; and an upstream edge of the radially outer shroud may flare radially outwardly relative to a downstream portion of the outer shroud for enhancing the effective area of air inlets.

The upstream edge of the outer shroud may include a repeating V-shaped pattern, and an upstream vertex of the V-shape may flare radially outwardly relative to the downstream portion of the V-shape.

The second outer air swirler portion may include a radially outer shroud defining an outer wall, a radially inner shroud defining an inner wall, and swirler vanes that together with the outer wall and inner wall define the plurality of air passages; and an upstream edge of the outer shroud of the second outer air swirler portion may flare radially outwardly relative to a downstream portion of the outer shroud for enhancing the effective area of air inlets.

The upstream edge of the outer shroud of the second outer air swirler portion may include a repeating V-shaped pattern, and an upstream vertex of the V-shape may flare radially outwardly relative to the downstream portion of the V-shape.

According to another aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and a plurality of fuel flow passages extending from the fuel manifold to the outlet section; wherein each of the plurality of fuel flow passages includes an inlet opening that opens into the fuel manifold, the inlet opening of each one of the plurality fuel flow passages being contiguous with the inlet opening of another one of the plurality fuel flow passages.

Embodiments of the invention may include one or more of the following additional features, separately or in combination.

Each of the plurality of fuel flow passages may include an inlet opening that opens through a radially inwardly extending wall of the fuel manifold, and a portion of the radially inwardly extending wall of the fuel manifold may protrude inwardly toward the center of the fuel manifold.

Each of the plurality of fuel flow passages may have a cross-sectional area transverse to a direction of fluid flow in which the cross-sectional area converges as the fuel flow passage extends from the fuel manifold toward the outlet section.

According to another aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and f one or more fuel flow passages extending from the fuel manifold to the outlet section; wherein each of the one or more fuel flow passages includes an inlet opening that opens through a radially inwardly extending wall of the fuel manifold, and a portion of the radially inwardly extending wall of the fuel manifold protrudes inwardly toward the center of the fuel manifold.

Embodiments of the invention may include one or more of the following additional features, separately or in combination.

For example, the portion of the wall protruding radially inwardly toward the center of the manifold may be a V-shaped protrusion.

The V-shaped protrusion may be located toward the upstream end portion of the fuel swirly body.

According to another aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and a plurality of fuel flow passages extending from the fuel manifold to the outlet section; wherein the fuel swirler body includes a plurality of windows extending through the fuel swirler body for reducing stresses, the plurality of windows being located between the plurality of fuel flow passages.

Embodiments of the invention may include one or more of the following additional features, separately or in combination.

The plurality of fuel flow passages may be internal fuel flow passages enclosed by the fuel swirler body.

The fuel swirler body may be a monolithic seamless construction, including a fuel prefilmer at the downstream portion of the fuel swirly body.

The fuel swirler body may have an axially extending notch at an axial upstream end thereof for stress reduction, the notch being circumferentially spaced apart from and opposite the fuel manifold.

According to another aspect of the invention, a fuel swirler for a fuel nozzle in a gas turbine engine includes: a fuel swirler body having an upstream portion and a downstream portion; an inlet section at the upstream portion of the fuel swirler body, the inlet section having a fuel manifold for fluid communication with a fuel source; an outlet section at the downstream portion of the fuel swirler body; and one or more fuel flow passages extending from the fuel manifold to the outlet section; wherein the fuel swirler body has an axially extending notch at an axial upstream end thereof for stress reduction, the notch being circumferentially spaced apart from and opposite the fuel manifold.

According to another aspect of the invention, an outer air swirler for a fuel nozzle for a gas turbine engine includes: a first outer air swirler portion and a second outer air swirler portion radially inward of the first outer air swirler portion; wherein the first and second outer air swirler portions each include a plurality of air flow passages having air inlets at an upstream portion thereof; and wherein the air inlets of the first outer air swirler portion are axially offset from the air inlets of the second outer air swirler portion.

Embodiments of the invention may include one or more of the following additional features, separately or in combination.

The air inlets for the second outer air swirler portion may be axially upstream of the air inlets for the first outer air swirler portion.

The first outer air swirler portion may include a radially outer shroud defining an outer wall with a repeating V-shaped upstream edge portion, a radially inner shroud defining an inner wall, and swirler vanes that together with the outer wall and inner wall define the plurality of air passages of the first outer air swirler portion, wherein the outer wall and inner wall may be shaped to direct air partially radially inwardly then generally axially into the swirler vanes in a continuous and smooth manner, and separation walls of the swirler vanes may extend radially inwardly from the bottom of the V-shaped edge portion and the inner wall to form a plurality of air passage inlet guide surfaces which are streamline-contoured to direct air generally axially then partially tangentially into the swirler vanes in a continuous and smooth manner.

The separation walls and/or the V-shaped edge portions may be formed with a slight taper, and may have respective upstream edges with a smooth full radius such that disruptions to the air flow are minimized.

The second outer air swirler portion may include a radially outer shroud defining an outer wall with a repeating V-shaped upstream edge portion, a radially inner shroud defining an inner wall, and swirler vanes that together with the outer wall and inner wall define the plurality of air passages, wherein the radially inner shroud of the first outer air swirler portion may form the radially outer shroud of the second outer air swirler portion.

The first outer air swirler portion and the second outer air swirler portion may be circumferentially aligned, such the respective separation walls are shared between the first and second outer air swirler portions, and the respective air inlet guide surfaces of the first and second outer air swirler portions are configured to guide flow in the same direction.

The first outer air swirler portion and the second outer air swirler portion may be circumferentially offset, such that the respective separation walls are not shared between the first and second outer air swirler portions, and the respective air inlet guide surfaces of the first and second outer air swirler portions can guide flow independently of one another.

The first outer air swirler portion may include a radially outer shroud defining an outer wall, a radially inner shroud defining an inner wall, and swirler vanes that together with the outer wall and inner wall define the plurality of air passages; and an upstream edge of the outer shroud may flare radially outwardly relative to a downstream portion of the outer shroud for enhancing the effective area of air inlets.

According to another aspect of the invention, an air swirler for a fuel nozzle for a gas turbine engine includes: a radially outer shroud defining an outer wall, a radially inner shroud defining an inner wall, and swirler vanes that together with the outer wall and inner wall define the plurality of air passages; wherein an upstream edge of the radially outer shroud flares radially outwardly relative to a downstream portion of the outer shroud for enhancing the effective area of air inlets.

Embodiments of the invention may include one or more of the following additional features, separately or in combination.

The air swirler may be an outer air swirler having a first outer air swirler portion and a second outer air swirler portion radially inward of the first outer air swirler portion; wherein the first and second outer air swirler portions may each include a plurality of air flow passages having air inlets at an upstream portion thereof.

The first outer air swirler portion may include the radially outer shroud defining the outer wall, the radially inner shroud defining the inner wall, and the swirler vanes that together with the outer wall and inner wall define the plurality of air passages; and the upstream edge of the radially outer shroud may flare radially outwardly relative to a downstream portion of the outer shroud for enhancing the effective area of air inlets.

The upstream edge of the outer shroud may include a repeating V-shaped pattern, and an upstream vertex of the V-shape may flare radially outwardly relative to the downstream portion of the V-shape.

The second outer air swirler portion may include the radially outer shroud defining the outer wall, the radially inner shroud defining the inner wall, and the swirler vanes that together with the outer wall and inner wall may define the plurality of air passages; and the upstream edge of the radially outer shroud may flare radially outwardly relative to a downstream portion of the outer shroud for enhancing the effective area of air inlets.

The upstream edge of the outer shroud of the second outer air swirler portion may include a repeating V-shaped pattern, and an upstream vertex of the V-shape may flare radially outwardly relative to the downstream portion of the V-shape.

The first and second outer air swirler portions may each include a plurality of air flow passages having air inlets at an upstream portion thereof; and the air inlets of the first outer air swirler portion may be axially offset from the air inlets of the second outer air swirler portion.

According to another aspect of the invention, a fuel nozzle for a gas turbine engine may include the fuel swirler according to any of foregoing and/or the outer air swirler according to any of the foregoing.

Embodiments of the invention may include one or more of the following additional features, separately or in combination.

The outer air swirler may outwardly surround an inner air swirler, and the fuel swirler may be radially interposed between the inner air swirler and the outer air swirler.

According to another aspect of the invention, a gas turbine engine includes the fuel nozzle, the fuel swirler, and/or the outer air swirler according to any of the foregoing.

While a preferred form of the exemplary fuel injector and fuel nozzle has been described above, it should be apparent to those skilled in the art that other nozzle (and stem) designs could also be used with the present invention. The invention is not limited to any particular nozzle design, but rather is appropriate for a wide variety of commercially-available nozzles.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fuel swirler for a fuel nozzle in a gas turbine engine, the fuel swirler comprising:
   a fuel swirler body having an upstream portion and a downstream portion;
   an inlet section at the upstream portion of the fuel swirler body, the inlet section having a fuel manifold for fluid communication with a fuel source;
   an outlet section at the downstream portion of the fuel swirler body; and
   one or more fuel flow passages extending from the fuel manifold to the outlet section;
   wherein each of the one or more fuel flow passages has a cross-sectional area transverse to a direction of fluid flow in which the cross-sectional area continuously converges from the fuel manifold toward the outlet section.

2. The fuel swirler according to claim 1, wherein each of the one or more fuel flow passages extends in a flow path direction along the fuel swirler body, and wherein each of the one or more fuel flow passages continuously changes the flow path direction from the fuel manifold to the outlet section to restrict boundary layer growth.

3. The fuel swirler according to claim 1, wherein the one or more fuel flow passages include a plurality of fuel flow passages, wherein each of the plurality of fuel flow passages has a cross-sectional area profile as each fuel flow passage extends from the fuel manifold toward the outlet section, and wherein each of the plurality of fuel flow passages has the same cross-sectional area profile.

4. The fuel swirler according to claim 1, wherein the one or more fuel flow passages include a plurality of fuel flow passages, wherein each of the plurality of fuel flow passages includes an outlet end that opens into the outlet section, and wherein the respective outlet ends of the plurality of fuel flow passages form an array of outlet ends that are circumferentially spaced apart about a longitudinal axis of the fuel swirler body.

5. The fuel swirler according to claim 1, wherein the one or more fuel flow passages include a plurality of fuel flow passages, wherein each of the plurality of fuel flow passages includes a metering slot at an outlet end of the respective fuel flow passage, and wherein the respective metering slots of the plurality of fuel flow passages are configured to open into the outlet section.

6. The fuel swirler according to claim 5, wherein the respective metering slots each have a cross-sectional area that converges as the respective metering slots extend toward the outlet section.

7. The fuel swirler according to claim 5, wherein the respective metering slots each have a cross-sectional area that is uniform as the respective metering slots extend toward the outlet section.

8. The fuel swirler according to claim 5, wherein the respective metering slots are each inclined at a slot angle relative to a plane perpendicular to a longitudinal axis of the fuel swirler body, and are each inclined in a circumferential direction around the longitudinal axis.

9. The fuel swirler according to claim 8, wherein the slot angle for each of the respective metering slots is the same or is different; and/or
wherein a cross-sectional area for each of the respective metering slots is the same or is different.

10. The fuel swirler according to claim 5, wherein the fuel swirler further includes a swirl annulus at the outlet section, and wherein the respective metering slots open into the swirl annulus at a slot angle to provide swirling flow of fuel spray exiting the respective metering slots.

11. The fuel swirler according to claim 1, wherein the fuel swirler further includes a fuel prefilmer at the downstream portion of the fuel swirler body, the fuel prefilmer having an axially extending swirl annulus at an upstream portion thereof, and a radially inwardly converging portion at a downstream portion thereof, and the fuel prefilmer being configured to terminate at a downstream prefilmer orifice.

12. The fuel swirler according to claim 1, wherein the one or more fuel flow passages are internal fuel flow passages enclosed by the fuel swirler body.

13. The fuel swirler according to claim 1, wherein the fuel swirler body is a monolithic seamless construction, the monolithic seamless construction including a fuel prefilmer at the downstream portion of the fuel swirler body.

14. The fuel swirler according to claim 1,
wherein the one or more fuel flow passages includes a plurality of fuel flow passages extending from the fuel manifold to the outlet section; and
wherein each of the plurality of fuel flow passages includes an inlet opening that opens into the fuel manifold, the inlet opening of each one of the plurality fuel flow passages being contiguous with the inlet opening of another one of the plurality of fuel flow passages.

15. The fuel swirler according to claim 1, wherein the one or more fuel flow passages include a plurality of fuel flow passages extending from the fuel manifold to the outlet section, wherein each of the plurality of fuel flow passages includes an inlet opening that opens through a radially inwardly extending wall of the fuel manifold, and a portion of the radially inwardly extending wall of the fuel manifold protrudes inwardly toward the center of the fuel manifold.

16. The fuel swirler according to claim 15, wherein the portion of the wall protruding radially inwardly toward the center of the fuel manifold is a V-shaped protrusion.

17. The fuel swirler according to claim 16, wherein the V-shaped protrusion is located toward the upstream end-portion of the fuel swirler body.

18. The fuel swirler according to claim 1, wherein the one or more fuel flow passages include a plurality of fuel flow passages, and wherein each of the plurality of fuel flow passages has a cross-sectional area transverse to the direction of fluid flow in which the cross-sectional area converges as the fuel flow passage extends from the fuel manifold toward the outlet section.

19. The fuel swirler according to claim 1,
wherein the one or more fuel flow passages includes a plurality of fuel flow passages extending from the fuel manifold to the outlet section; and
wherein the fuel swirler body includes a plurality of windows extending through the fuel swirler body for reducing stresses, the plurality of windows being located between the plurality of fuel flow passages.

20. The fuel swirler according to claim 19, wherein the plurality of fuel flow passages are internal fuel flow passages enclosed by the fuel swirler body.

21. The fuel swirler according to claim 19, wherein the fuel swirler body is a monolithic seamless construction, the monolithic seamless construction including a fuel prefilmer at the downstream portion of the fuel swirler body.

22. The fuel swirler according to claim 19, wherein the fuel swirler body has an axially extending notch at an axial upstream end thereof for stress reduction, the axially extending notch being circumferentially spaced apart from and opposite the fuel manifold.

23. A fuel nozzle for a gas turbine engine, the fuel nozzle comprising:
an inner air swirler,
an outer air swirler outwardly surrounding the inner air swirler,
the fuel swirler according to claim 1 being radially interposed between the inner air swirler and the outer air swirler;
a fuel feed tube configured to direct a source of fuel toward the fuel swirler; and
a housing at least partially enclosing the fuel swirler and the fuel feed tube.

24. A fuel swirler for a fuel nozzle in a gas turbine engine, the fuel swirler comprising:
a fuel swirler body having an upstream portion and a downstream portion;
an inlet section at the upstream portion of the fuel swirler body, the inlet section having a fuel manifold for fluid communication with a fuel source;
an outlet section at the downstream portion of the fuel swirler body;
a plurality of fuel flow passages extending between the fuel manifold and the outlet section, wherein each of the plurality of fuel flow passages has a cross-sectional area transverse to a direction of fluid flow in which the cross-sectional area continuously converges from the fuel manifold toward the outlet section; and
a swirl annulus at the outlet section for providing a swirling flow of fuel discharged from the plurality of fuel flow passages, the swirl annulus having a radially inwardly converging portion at a downstream portion thereof.

* * * * *